(12) United States Patent
Motomiya et al.

(10) Patent No.: US 10,654,417 B2
(45) Date of Patent: May 19, 2020

(54) ELECTRIC RETRACTABLE VIEW DEVICE FOR VEHICLE

(71) Applicant: MURAKAMI CORPORATION, Shizuoka (JP)

(72) Inventors: Masahiro Motomiya, Fujieda (JP); Kenji Ichikawa, Shizuoka (JP)

(73) Assignee: MURAKAMI CORPORATION, Shizuoka (JP)

(*) Notice: Subject to any disclaimer, the term of this patent is extended or adjusted under 35 U.S.C. 154(b) by 106 days.

(21) Appl. No.: 15/924,809

(22) Filed: Mar. 19, 2018

(65) Prior Publication Data
US 2018/0281683 A1 Oct. 4, 2018

(30) Foreign Application Priority Data

Mar. 31, 2017 (JP) .................. 2017-071003

(51) Int. Cl.
| | | |
|---|---|---|
| *B60R 1/074* | (2006.01) | |
| *B60R 1/076* | (2006.01) | |
| *F16H 1/16* | (2006.01) | |
| *F16H 19/00* | (2006.01) | |
| *F16H 1/22* | (2006.01) | |

(52) U.S. Cl.
CPC ............. *B60R 1/074* (2013.01); *B60R 1/076* (2013.01); *F16H 1/16* (2013.01); *F16H 19/001* (2013.01); *F16H 1/225* (2013.01)

(58) Field of Classification Search
None
See application file for complete search history.

(56) References Cited

U.S. PATENT DOCUMENTS 5,545,090 A * 8/1996 Kirschey .................. F16D 3/74
464/96
2008/0084624 A1* 4/2008 Onuki ..................... B60R 1/074
359/841

FOREIGN PATENT DOCUMENTS

| JP | 2000-264130 | 9/2000 |
| JP | 2014-24387 | 2/2014 |

OTHER PUBLICATIONS

KHK, "Worm Gears: What are worm gears?" available at https://khkgears.net/new/worm_gear.html (Year: 2015).*
(Continued)

*Primary Examiner* — Jennifer D. Carruth
(74) *Attorney, Agent, or Firm* — Greenblum & Bernstein, P.L.C.

(57) ABSTRACT

The electric retractable view device for a vehicle includes a view device rotating section including a view section body mounted therein, a rotation support section that supports the view device rotating section so as to be rotatable relative to a predetermined rotation axis, and an electric driving mechanism that electrically moves the view device rotating section to either of a retracted position and an extended position. The electric driving mechanism includes a motor, and a power transmission mechanism that transmits a drive force of the motor to the view device rotating section to rotate the view device rotating section in the direction around the rotation axis. The power transmission mechanism includes a double-threaded worm, and one or more motor-side worms disposed on the motor side relative to the double-threaded worm. Each of the one or more motor-side worms is a single-threaded worm.

10 Claims, 13 Drawing Sheets

(56) References Cited

OTHER PUBLICATIONS

Antriebstechnik, "Worm Gear with Backlash-Adjustable Toothing," 1991, pp. 1-4, vol. No. 4, Offprint from Antriebstechnik 30, available at: http://www.henschel.eu/data/DUPLEX-SD-AT-1991-english.pdf as early as Sep. 2, 2009.
KHK, "Duplex Worm Gears," pp. 364 and 365, available at https://khkgears.net/pdf/3015/worm-gears.pdf as early as Dec. 3, 2019.
Wikipedia, "Duplex Worm," pp. 1-3, available at https://en.wikipedia.org/wiki/Duplex_worm, available as early as Oct. 5, 2017 (see last edited date in p. 3).

* cited by examiner

FIG.19

| CASE | NUMBER OF THREADS (STARTS) OF WORM | | NUMBER OF ROTATIONS PER PREDETERMINED TIME PERIOD | | | | OBSERVATIONS |
|---|---|---|---|---|---|---|---|
| | D: WORM 8 | B: WORM 5 | D: WORM8 | C: WORM WHEEL 50 | B: WORM5 | A: WORM WHEEL 54 | |
| No.1 | 1 | 1 | 1000 | 100 | 100 | 10 | SPEEDS OF GEARS B, C AND D ALL HIGH |
| No.2 | 2 | 1 | 500 | 100 | 100 | 10 | SPEED OF ONLY WORM DRIVE D IS LOW |
| No.3 | 1 | 2 | 500 | 50 | 50 | 10 | SPEEDS OF GEARS B, C AND D ALL LOW |
| No.4 | 2 | 2 | 250 | 50 | 50 | 10 | SPEEDS OF GEARS B, C AND D ALL LOW, BUT ULTRALOW ROTATION AND ULTRAHIGH TORQUE MOTOR NEEDED |

ELECTRIC RETRACTABLE VIEW DEVICE FOR VEHICLE

The disclosure of Japanese Patent Application No. JP2017-071003 filed on Mar. 31, 2017 including the specification, drawings, claims and abstract is incorporated herein by reference in its entirety.

BACKGROUND OF THE INVENTION

1. Field of the Invention

This invention relates to an electric retractable view device for a vehicle. In the electric retractable view device of this invention, a double-threaded worm (double start worm) is used in a power transmission mechanism, reducing wear of gears and the like by taking some ingenuity in disposition of the double-threaded worm.

2. Description of the Related Art

As conventional electric retractable view devices for a vehicle in which a multiple-threaded worm (multiple start worm) is disposed in a power transmission system, there are electric retractable door mirrors described in Japanese Patent Laid-Open Nos. 2014-024387 and 2000-264130. The electric retractable door mirror described in Japanese Patent Laid-Open No. 2014-024387 is one that uses a multiple-threaded worm as a worm connected to a motor shaft. The electric retractable door mirror described in Japanese Patent Laid-Open No. 2000-264130 includes at least three worm drives in a power transmission system, and a multiple-threaded worm is used as a worm of at least one worm drive of the worm drives.

The electric retractable door mirror described in Japanese Patent Laid-Open No. 2014-024387 enables motor rotation speed reduction compared to an electric retractable door mirror using a single-threaded worm as a worm connected to a motor shaft, if the retraction/extension speeds of the mirror bodies (that is, the mirror rotating sections) of both door mirrors are the same. However, the rotation speeds of the gears on the downstream side of the worm connected to the motor shaft do not change regardless of whether the worm is single-threaded or multiple-threaded. Therefore, this door mirror just enables motor rotation speed reduction, and the rotation speeds of many gears remain high, and thus, problems such as many gears being worn early remain.

The electric retractable door mirror described in Japanese Patent Laid-Open No. 2000-264130 enables motor rotation speed reduction by use of a multiple-threaded worm, compared to an electric retractable door mirror using a single-threaded worm (single start worm), if the retraction/extension speeds of the mirror bodies of both door mirrors are the same. However, where a multiple-threaded worm is used on the upstream side, the rotation speeds of many gears on the downstream side thereof remain high, and thus problems such as many gears being worn early remain.

This invention solves the aforementioned problems in the conventional techniques and provides an electric retractable view device for a vehicle, the electric retractable view device, where a double-threaded worm is used in a power transmission mechanism, reducing wear of gears and the like by taking some ingenuity in disposition of the double-threaded worm.

SUMMARY OF THE INVENTION

An electric retractable view device for a vehicle according to this invention includes: a view device rotating section including a view section body mounted therein, a rotation support section that supports the view device rotating section in such a manner that the view device rotating section is rotatable relative to a vehicle body in a direction around a predetermined rotation axis, and an electric driving mechanism that electrically drives the view device rotating section to rotate in the direction around the rotation axis and thereby moves the view device rotating section to either of a retracted position and an extended position, and the electric driving mechanism includes a motor, and a power transmission mechanism that transmits a drive force of the motor to the view device rotating section to rotate the view device rotating section in the direction around the rotation axis, the power transmission mechanism includes a double-threaded worm, and one or more motor-side worms disposed on the motor side relative to the double-threaded worm, and each of the one or more motor-side worms is a single-threaded worm. The electric retractable view device for a vehicle according to this invention enables reduction in rotation of the double-threaded worm and gears and the like on the upstream side thereof, compared to an electric retractable view device for a vehicle in which the double-threaded worm is a single-threaded worm, if moving speeds of both view device rotating sections are the same. As a result, wear of the double-threaded worm and the gears and the like on the upstream side thereof can be reduced.

In this invention, it is possible that: the rotation support section includes a shaft provided in a standing manner on the vehicle body side; the view device rotating section is supported by the shaft so as to be rotatable in a direction around an axis of the shaft; the motor is mounted in the view device rotating section; and the power transmission mechanism includes a mechanism that transmits the drive force of the motor to the shaft to rotate the view device rotating section in the direction around the axis of the shaft. In this case, it is possible that: the power transmission mechanism includes a first worm wheel fitted on an outer circumference of the shaft and thereby coupled to the shaft, and a first worm that engages with the first worm wheel and thereby provides a first worm drive; and the first worm is the double-threaded worm. This electric retractable view device for a vehicle enables reduction in rotation of the first worm and the gears and the like on the upstream side thereof, compared to an electric retractable view device for a vehicle in which the first worm is a single-threaded worm, if the moving speeds of both view device rotating sections are the same, enabling reduction of wear of the first worm and the gears and the like on the upstream side of the first worm.

In this invention, it is possible that: the power transmission mechanism includes a second worm connected to a motor shaft of the motor, a second worm wheel that engages with the second worm and thereby provides a second worm drive, and an intermediate transmission mechanism that transmits rotation of the second worm wheel to the first worm; and the second worm is the only motor-side worm in the power transmission mechanism. According to this electric retractable view device for a vehicle, rotation of the motor may be slow, compared to an electric retractable view device for a vehicle in which a third worm is disposed between the second worm and the first worm, if the moving speeds of both rotating sections are the same, and thus, wear of the second worm drive can be reduced. In particular, if the intermediate transmission mechanism includes an axle of the first worm that coaxially directly connects the second worm wheel and the first worm, the second worm wheel may rotate at a low speed that is the same as that of the first worm, enabling further reduction of wear of the second worm drive.

In this invention, it is possible that a lead angle of the double-threaded worm is set to 8 to 15 degrees. In general, a double-threaded worm has a large lead angle and is thus used for a purpose of preventing self-locking (that is, enabling the worm to be rotated from a worm wheel), and is not used for a purpose that needs self-locking. In an electric retractable view device for a vehicle, if self-locking is not available, when the vehicle is running, inconveniences such as deterioration in visibility by backlash of the rotating section and/or unintended movement of the position of the rotating section caused due to, e.g., vibration of the vehicle occur. As a result of the lead angle of the double-threaded worm being set to 8 to 15 degrees, even though the double-threaded worm is used, the double-threaded worm can be self-locked, enabling suppression of backlash and/or unintended movement of the rotating section when the vehicle is running.

BRIEF DESCRIPTION OF THE DRAWINGS

FIG. 6 is a plan view of the inside of the electric retracting unit in FIG. 1 as viewed from above with a seal cap and the outer plate seen through;

FIG. 19 is a table indicating an example of differences in number of rotations among respective gears where disposition of a double-threaded worm is changed in various ways in the power transmission mechanism in FIG. 1.

DETAILED DESCRIPTION OF THE PREFERRED EMBODIMENT

An embodiment of this invention will be described. A door mirror indicated in this embodiment is configured based on the door mirrors described as embodiments of the inventions in Japanese Patent Laid-Open Nos. 2016-190543, 2016-190545, 2016-190546, 2016-190549 and 2016-215800, Japanese Utility Model Registration Nos. 3197992, 3197994 and 3197995 and International Publication Nos. WO2016/158498, WO2016/158500, WO2016/158502, WO2016/158506 and WO2016/185881 according to applications filed by the present applicant. Therefore, these publications should be referred to for parts not described in the below embodiment.

Figure 2:
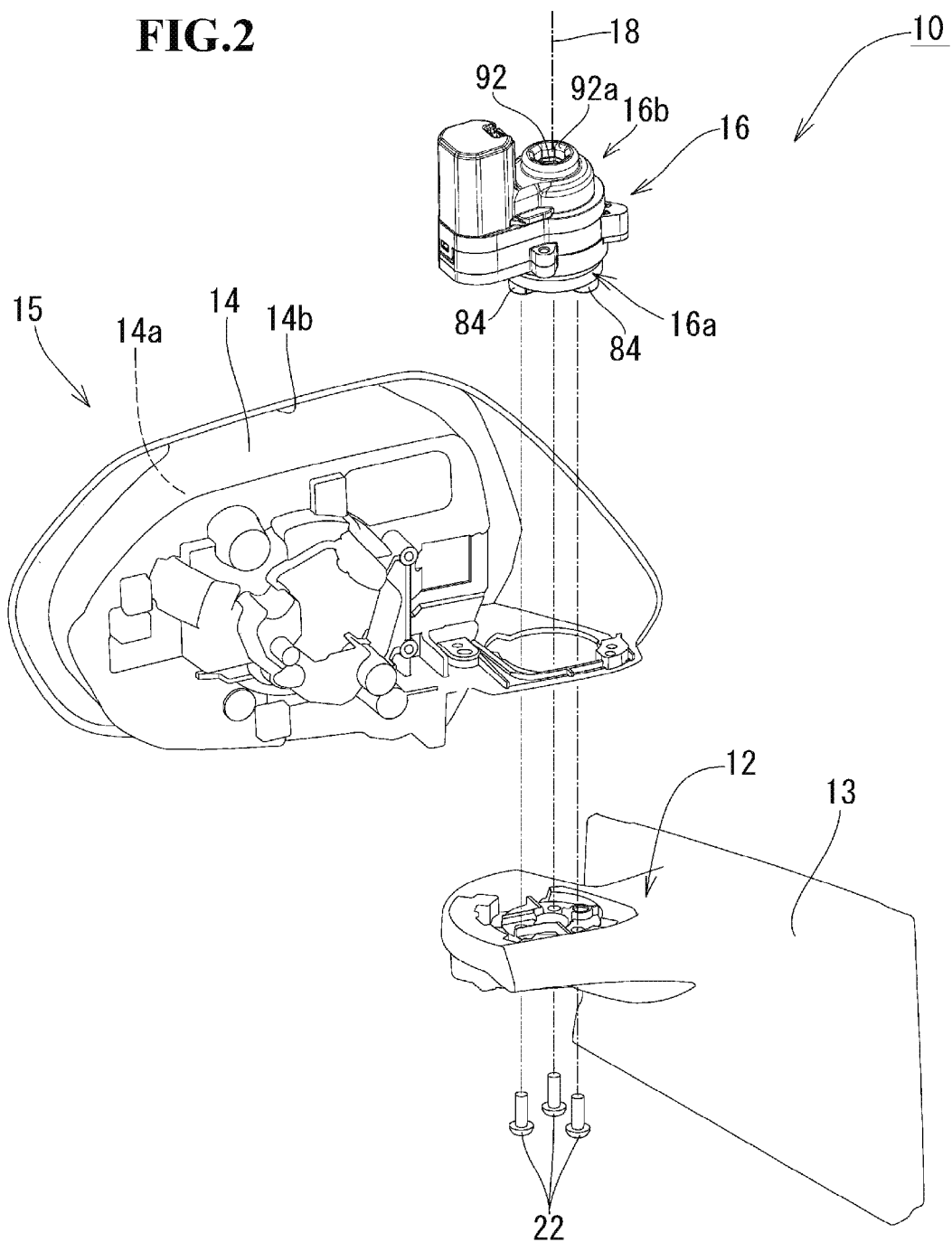
FIG. 2 is an exploded perspective view of an electric retractable door mirror for a vehicle to which this invention is applied.

FIG. 2 is an exploded view of an electric retractable door mirror for a vehicle to which this invention is applied. FIG. 2 illustrates a state of a mirror rotating section 15 (view device rotating section) in an extended position as viewed from the back side (that is, the vehicle front side). Also, in FIG. 2, illustration of, e.g., a mirror surface adjustment actuator and a mirror plate (that is, a view section body) both disposed in a front opening 14a of a visor 14 and a housing cover fitted on the back side of the visor 14 is omitted. This door mirror 10 includes a mirror base 12, the mirror rotating section 15, and an electric retracting unit 16 connected between the mirror base 12 and the mirror rotating section 15. The mirror rotating section 15 includes the visor 14. The mirror base 12 is provided so as to protrude from a vehicle body (right door in this example) 13 to the right of the vehicle. The electric retracting unit 16 includes a fixed part 16a in a lower part and a rotating part 16b in an upper part. The rotating part 16b is rotatable relative to the fixed part 16a in a direction around a mirror rotation axis 18. The rotating part 16b of the electric retracting unit 16 is fixed to the back side of the visor 14 via non-illustrated screws. In a state in which the rotating part 16b is fixed to the visor 14, three screws 22 are screwed into the fixed part 16a of the electric retracting unit 16 from the lower side of the mirror base 12, whereby the fixed part 16a of the electric retracting unit 16 is fixed to the mirror base 12. Consequently, the mirror rotating section 15 including the visor 14 is attached to and thereby supported by the mirror base 12 via the electric retracting unit 16 so as to be rotatable in the direction around the mirror rotation axis 18. The non-illustrated housing cover is fitted on a back surface of the visor 14. Consequently, an opening 14b in the back surface of the visor 14 is occluded by the housing cover. As a result, the electric retracting unit 16 is received in a space surrounded by the visor 14 and the housing cover. The mirror rotating section 15 rotates upon being electrically driven by the electric retracting unit 16, and is movable to a retracted position and an extended position selectively. Also, upon the mirror rotating section 15 receiving an external force having a predetermined value or more in the direction of rotation thereof, a clutch mechanism 41 in the electric retracting unit 16 is disengaged. Upon the disengagement of the clutch mechanism 41, the mirror rotating section 15 is rotated by the external force and is thus movable from the retracted position to a forward-titled position through the extended position and vice versa.

Figure 1:
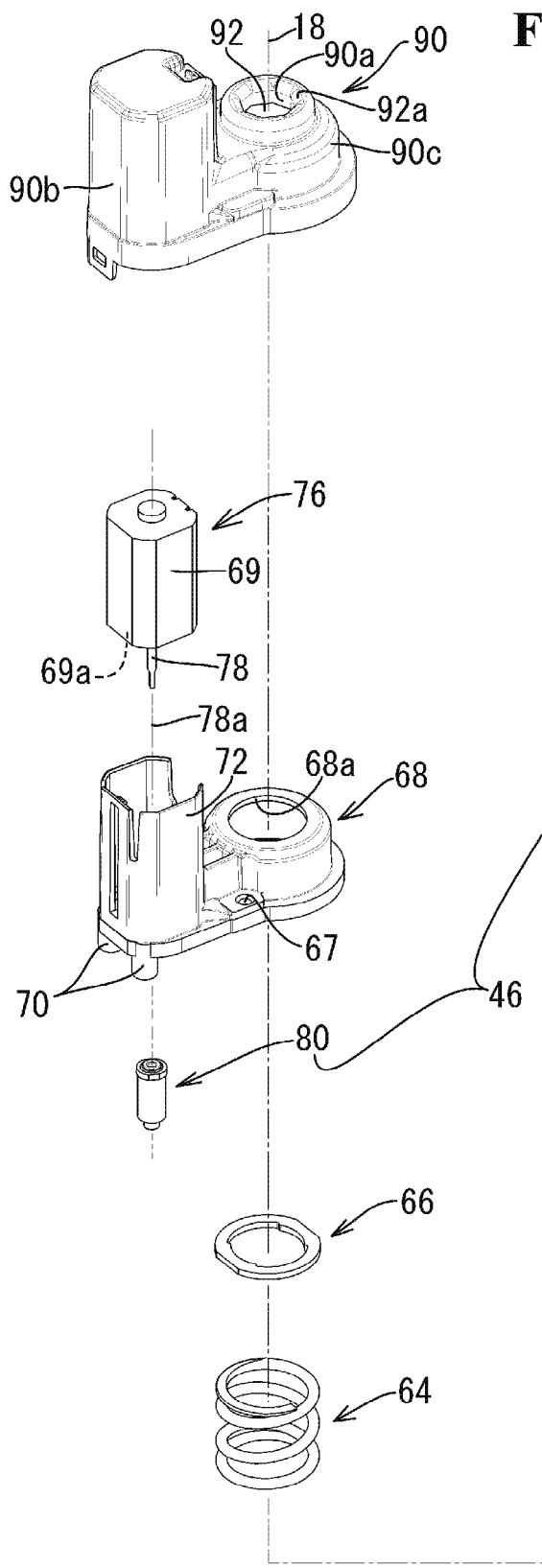
FIG. 1 is a diagram illustrating an embodiment of this invention and is an exploded perspective view of the electric retracting unit illustrated in FIG. 2.
Figure 1:
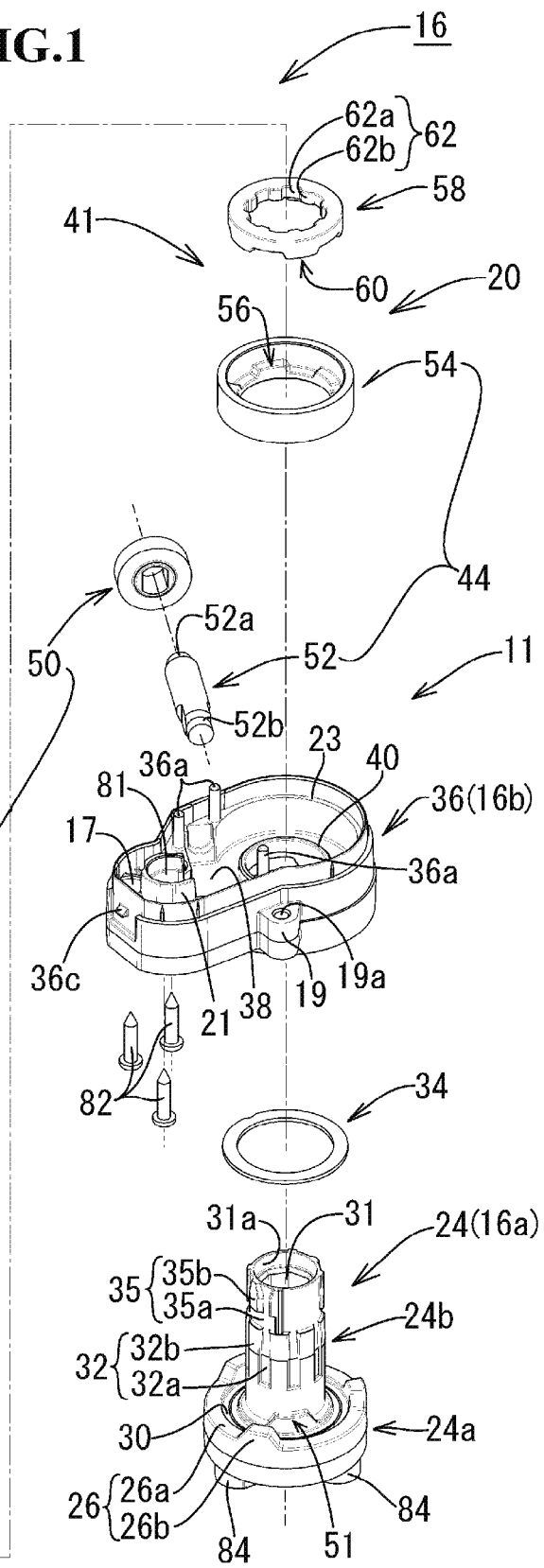

FIG. 1 illustrates the electric retracting unit 16 disassembled into individual components. A shaft 24 forms the fixed part 16a of the electric retracting unit 16. In other words, the shaft 24 corresponds to the fixed part 16a. The shaft 24 is formed of an integrally-molded piece of a steel (for example, a casted piece). The shaft 24 coaxially includes a shaft base 24a having a large diameter and a disk-like shape in a lower part and a shaft axle 24b having a small diameter and a cylindrical shape in an upper part. The mirror rotation axis 18 corresponds to an axis 18 of the shaft 24. A lower surface of the shaft base 24a is fixed to the mirror base 12 via the screws 22 (FIG. 2) and the shaft 24 is thereby provided upright so as to be orthogonal to the mirror base 12. A crest-valley repeated shape 26 is formed at an outermost circumferential position in an upper surface of the shaft base 24a, and a bearing surface 30 is formed on the radially inward side of the crest-valley repeated shape 26. A resin washer 34 is placed on the bearing surface 30. Height maintaining protrusions 51 are formed on the radially inward side of the bearing surface 30 so as to be joined to an outer circumferential surface of the shaft axle 24b. The height maintaining protrusions 51 serve to maintain a height of a frame 36 relative to the shaft 24 when the mirror rotating section 15 is moved from the extended position toward the forward-tilted position by an external force. In other words, when the mirror rotating section 15 is moved from the extended position toward the forward-tilted position by an external force, the height maintaining protrusions 51 and height maintaining protrusions 53 (FIG. 4B) of the frame 36 maintain the height of the frame 36 relative to the shaft 24 by abutment and sliding between both top surfaces of the height maintaining protrusions 51, 53. Consequently, the mirror rotating section 15 can be electrically returned from the forward-tilted position to the extended position. Here, operations of the height maintaining protrusions 51, 53 are described in detail in Japanese Utility Model Registration No. 3197994 according to an application filed by the present applicant and thus should be referred to. In FIG. 1, on the axis of the shaft 24, a hollow 31 is provided so as to extend through an entire length of the shaft 24. The hollow 31 has a regular octagonal shape in a cross-section in a direction orthogonal to the axis, over an entire length in the axis direction except a top area 31a. The top area 31a of the hollow 31 has a round shape in a cross-section in the direction orthogonal to the axis, the round shape having a size that allows the round shape to substantially circumscribe the regular octagonal shape below the round shape. A barrel 90a of a later-described seal cap 90 is put on the top area 31a having such round shape in such a manner that the barrel 90a and the top area 31a are rotatable relative to each other. A non-illustrated harness (that is, an electric wire bundle) that supplies electric power to, e.g., the electric retracting unit 16 and the mirror surface adjustment actuator is inserted through the hollow 31. The shaft axle 24b has a round outer shape in the direction orthogonal to the axis. A rotation preventing projection/recess shape 32 is disposed on the lower side and a plate locking projection/recess shape 35 is formed on the upper side along the axis 18 of the outer circumferential surface of the shaft axle 24b. The rotation preventing projection/recess shape 32 prevents rotation of a clutch plate 58 in a direction around an axis of the clutch plate 58 while allowing movement of the clutch plate 58 in the axis direction of the clutch plate 58. The rotation preventing projection/recess shape 32 is formed of eight equally-spaced rotation preventing recesses 32a and eight equally-spaced rotation preventing projections 32b alternately arranged circumferentially. The respective rotation preventing recesses 32a and the respective rotation preventing projections 32b are configured so as to extend in the axis direction of the shaft 24. An upper end of each of the rotation preventing recesses 32a opens upward in order to allow entry of a corresponding rotation preventing projection 62b of the clutch plate 58 to be fitted in the rotation preventing recess 32a. The plate locking projection/recess shape 35 locks a plate 66 made of a metal such as a steel, the plate 66 holding a coil spring 64 in a compressed state. The plate locking projection/recess shape 35 is formed of plate locking recesses 35a and plate locking projections 35b arranged in a proper pattern.

The rotating part 16b includes, e.g., the frame 36, an outer plate 68 (that is, a motor holding member) and a seal cap 90. An electric driving mechanism 11 is housed in the rotating part 16b. The electric driving mechanism 11 includes a motor 76 and a power transmission mechanism 20. Each of the frame 36, the outer plate 68 and the seal cap 90 is formed of an integrally-molded piece of a reinforced resin such as GF/PA resin (glass fiber-reinforced polyamide resin). The shaft axle 24b is inserted to a cylinder 40 of the frame 36. Consequently, the frame 36 is rotatably supported by the shaft 24. A power transmission mechanism 20 that transmits power of the motor 76 to the shaft 24 to perform an electric retracting/extending operation is received in an inner space 38 of the frame 36.

The power transmission mechanism 20 will be described. The power transmission mechanism 20 is formed of two worm drives 44, 46 and the clutch mechanism 41. The clutch mechanism 41 is disposed between the shaft 24 and the first worm drive 44. The second worm drive 46 is disposed between the motor 76 and the first worm drive 44. Upon the mirror rotating section 15 receiving a large external force in a rotation direction of the mirror rotating section 15, a self-locking effect of the two worm drives 44, 46 causes disengagement of the clutch mechanism 41 and thus enables release of the external force. Also, upon the mirror rotating section 15 receiving a small external force such as vibration, wind pressure or the like when the vehicle is running, the self-locking effect of the two worm drives 44, 46 enables the mirror rotating section 15 to be held in the extended position. The first worm drive 44 is formed of a worm 52 made of, for example, a steel (which is a double-threaded worm and forms a first worm) and a shaft outside-fitting gear 54 of, for example, a steel (which forms a first worm wheel). A lead angle of the double-threaded worm, that is, the worm 52 is set to be a small angle that allows the first worm drive 44 to be self-locked. The second worm drive 46 is formed of a worm 80 made of, for example, a synthetic resin (which is a single-threaded worm and forms a second worm) and a worm wheel 50 made of, for example, a synthetic resin (which forms a second worm wheel). A lead angle of the single-threaded worm that is the worm 80 is set to be a small angle that allows the second worm drive 46 to be self-locked. The clutch mechanism 41 is formed of a clutch surface 56 of the shaft outside-fitting gear 54, a clutch surface 60 and a rotation preventing projection/recess shape 62 (that is, rotation preventing recesses 62a and rotation preventing projections 62b) of the clutch plate 58, the rotation preventing projection/recess shape 32 of the shaft axle 24b, and the coil spring 64. The worm 52 and the worm wheel 50 are coaxially connected and integrated so as not to be rotatable relative to each other. Consequently, an axle of the worm 52 itself forms an intermediate transmission mechanism that transmits rotation of the worm wheel 50 to the worm 52. A motor shaft 78 is inserted to the worm 80. Consequently, the worm 80 and the motor shaft 78 are circumferentially coupled, and the worm 80 thus rotates following the motor shaft 78. The shaft outside-fitting gear 54, the clutch plate 58 and the coil spring 64 are coaxially and sequentially inserted to the shaft axle 24b protruding upward from the inner space of the frame 36. The coil spring 64 is fitted and held on the shaft axle 24b in a compressed state by the plate 66 fitted on an upper end of the shaft axle 24b. The shaft outside-fitting gear 54 is rotatable relative to the shaft axle 24b. On the other hand, since the rotation preventing projection/recess shape 62 of the clutch plate 58 and the rotation preventing projection/recess shape 32 of the shaft axle 24b are engaged with each other, the clutch plate 58 is not rotatable relative to the shaft axle 24b in the direction around the axis and is movable only in the axis direction. Also, the upward-pointing clutch surface 56 of the shaft outside-fitting gear 54 and the downward-pointing clutch surface 60 of the clutch plate 58 engage with each other via a pressing force of the coil spring 64. Since the clutch plate 58 is not rotatable in the direction around the axis of the shaft axle 24b, the shaft outside-fitting gear 54 is also not rotatable in the direction around the axis of the shaft axle 24b in a state in which the clutch surfaces 56, 60 engage with each other. Upon the motor 76 being driven in this state, the worm 80 rotates following the rotation of the motor shaft 78, the worm wheel 50 engaging with the worm 80 rotates, and the worm 52 integrally assembled to the worm wheel 50 rotates, and the rotation is transmitted to the shaft outside-fitting gear 54 engaging with the worm 52. At this time, since the shaft outside-fitting gear 54 is not rotatable relative to the shaft axle 24b in the direction around the axis, instead, the worm 52 rotates around the shaft outside-fitting gear 54. Consequently, the frame 36 holding the worm 52 rotates in the direction around the axis 18, whereby an electric retracting/extending operation is performed. The electric retracting/extending operation is stopped by abutment between crests of the crest-valley repeated shape 26 of the shaft base 24a and a crest-valley repeated shape 27 (FIG. 4B) in a lower surface of the frame 36. Upon this stoppage being electrically detected, the driving of the motor 76 is stopped, and the mirror rotating section 15 is stopped at the retracted position or the extended position. In a state in which the mirror rotating section 15 is stopped at the extended position, even if the mirror rotating section 15 is subjected to vibration or wind pressure along with the vehicle running, the mirror rotating section 15 is held at the extended position by the self-locking effect of the two worm drives 44, 46. Also, in a state in which the mirror rotating section 15 is stopped at the extended position, when a large external force (that is, e.g., an impulsive force) is applied to the mirror rotating section 15 in a retraction direction, the worm 52 is prevented from rotating in a direction around an axis of the worm 52, by the self-locking effect of the two worm drives 44, 46. As a result, the clutch surfaces 56, 60 are disengaged against the pressing force of the coil spring 64, enabling the shaft outside-fitting gear 54 to rotate in the direction around the axis of the shaft axle 24b. Consequently, the mirror rotating section 15 is rotated in the retraction direction by the external force, whereby the external force is mitigated. Also, when a large external force is applied to the mirror rotating section 15 in a forward-tilting direction in a state in which the mirror rotating section 15 is stopped at the extended position, an operation similar to the above is performed. In other words, the clutch surfaces 56, 60 are disengaged against the pressing force of the coil spring 64, crests of the crest-valley repeated shapes 26, 27 are also disengaged against the pressing force of the coil spring 64. Consequently, the mirror rotating section 15 is rotated in the forward-tilting direction by the external force, whereby the external force is mitigated.

Since the worm 52 is formed of a double-threaded worm, in the above electric retracting/extending operation, rotation speeds of the worm 52 and the worm wheel 50 and the worm 80 positioned on the upstream side thereof are low. Therefore, wear of the worm 52, the worm wheel 50 and the worm 80 can be reduced. FIG. 19 is an example of differences in number of rotations among the respective gears depending on the disposition of the double-threaded worm. FIG. 19 indicates the numbers of rotation of the respective gears for making a retraction/extension speed of the mirror rotating section 15 equal in the respective cases (that is, making a rotation speed of the worm wheel 54 equal in the respective cases) with the case where the worms 80, 52 are both single-threaded in Case No. 1 as a reference. According to this figure, where the worm 80 is double-threaded and the worm 52 is single-threaded in Case No. 2, the number of rotations of the gear 80 is half of that in Case No. 1, but the numbers of rotations of the gears 50, 52 are the same as those in Case No. 1. On the other hand, where the worm 80 is single-threaded and the worm 52 is double-threaded in Case No. 3 according to this embodiment, the numbers of rotations of the gears 80, 50 and 52 are all half of those in Case No. 1. Therefore, Case No. 2 enables an increase in number of gears enabling reduction in number of rotations to reduce wear compared to case No. 1. Also, Case No. 4 in which the worms 80, 52 are both double-threaded, the numbers of rotations of the gears 80, 50 and 52 can be reduced. However, in Case No. 4, an expensive ultralow rotation and ultrahigh torque motor is needed as the motor 76, causing a large disadvantage due to cost increase.

In FIG. 1, the motor 76 is housed and held in a barrel 72 of the outer plate 68 so as to face downward. The motor shaft 78 is disposed through a hole 68b (FIGS. 5A, 5B, 8 and 10) of the outer plate 68. An upper opening of the frame 36 in which the power transmission mechanism 20 is housed is covered and thus occluded by the outer plate 68. At this time, the motor shaft 78 is inserted into the worm 80. The outer plate 68 is fixed to the frame 36 via screw fastening and welding. The screw fastening is performed using three screws 82. In other words, the screw fastening is performed by inserting the three screws 82 into respective screw through holes 37 (FIGS. 4A, 4B and 10) formed in the frame 36 from the lower side of the frame 36 and screwing the screws 82 into respective screw holes 71 (FIGS. 5B and 10) of three bosses 70 (screw-fastening areas) formed so as to protrude from a lower surface of the outer plate 68.

Figure 3A:
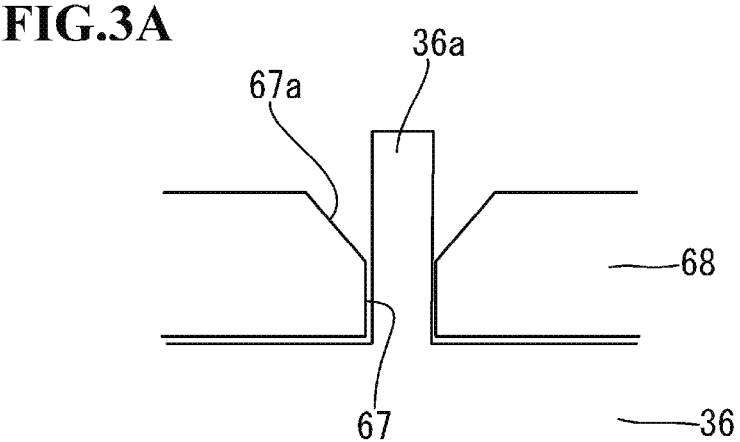
FIG. 3A is a schematic cross-sectional view illustrating a state of a weld part in which a frame and an outer plate are welded to each other in the electric retracting unit in FIG. 1 before the welding.
Figure 3B:
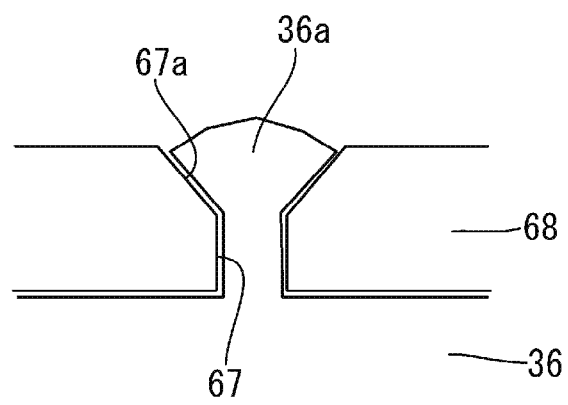
FIG. 3B is a schematic cross-sectional view of the weld part after the welding.

The fixation of the outer plate 68 and the frame 36 to each other via welding is performed as follows. In a circumferential edge of the inner space 38 of the frame 36, three resin shafts 36a, which are partial structures of the frame 36, are provided upright as additional fixation places at respective positions at which three resin shafts 36a overlap neither a motor body 69 nor the power transmission mechanism 20. In the outer plate 68, respective holes 67 are provided at positions corresponding to the respective resin shafts 36a. Upon the outer plate 68 being put on the frame 36, the resin shafts 36a are inserted into the respective holes 67. At this time, as illustrated in FIG. 3A, upper parts of the resin shafts 36a protrude upward of the respective holes 67. The protruding upper parts of the resin shaft 36a in this state are melted via, e.g., an ultrasonic welder. Since the upper parts 67a of the holes 67 are expanded upward in a basin-like shape, the upper parts of the resin shaft 36a are melt and spread inside the respective hole upper parts 67a in such a manner as in FIG. 3B. Once the melted parts solidify, the welding is completed. Since the hole upper parts 67a and the welded parts of the resin shafts 36a engage with each other along an inclined surface of the basin-like shape, the outer plate 68 is welded to the frame 36 in such a manner that backlash in a direction orthogonal to the surface and displacement in the surface direction are suppressed.

In FIG. 1, after the fixation of the outer plate 68 to the frame 36, the seal cap 90 is put on the outer plate 68. The seal cap 90 is fixed to the frame 36 via claw engagement. The frame 36 and the seal cap 90 form a case (outer casing) of the rotating part 16b of the electric retracting unit 16.

Figure 8:
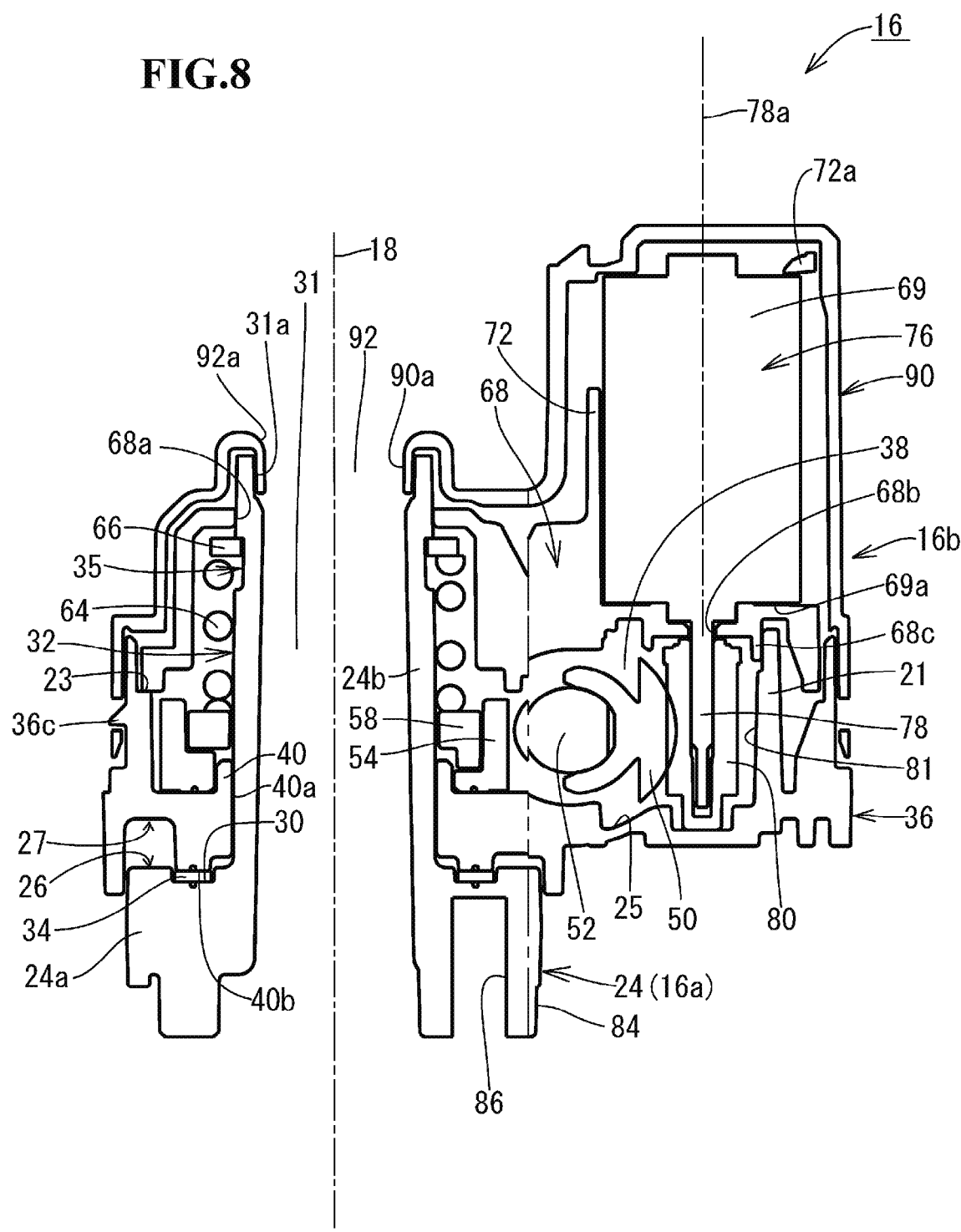
FIG. 8 is a cross-sectional view cut at the position indicated by arrows A-A in FIG. 7, in which, however, the seal cap is illustrated.

In the seal cap 90, two projections, which are a box-like part 90b covering the motor 76 and a dome 90c covering the shaft 24, are formed. A top of the dome 90c is folded inward and thereby forms a barrel 90a, and an opening 92 is formed in an inner circumference of the barrel 90a. The barrel 90a covers a top of the shaft 24. Consequently, the opening 92 is in communication with the hollow 31 of the shaft 24. The opening 92 formed by an inner circumferential surface of the barrel 90a is formed in a regular octagon having a size that is the same as that of the hollow 31 of the shaft 24. Consequently, depending on the rotational position of the rotating part 16b, the hollow 31 of the shaft 24 and the opening 92 form a continuous regular octagonal hollow. An outer circumferential surface of the barrel 90a has a round shape and is loosely fitted on a round inner circumferential surface of the top of the shaft 24 (surface of the circular top area 31a of the hollow 31) (see FIG. 8). Consequently, the barrel 90a is smoothly rotatable relative to the top of the shaft 24 in the direction around the axis of the shaft 24. Since the shaft 24 and the seal cap 90 rotate relative to each other along with an electric retracting/extending operation, depending on the rotational positions thereof, the regular octagon of the hollow 31 of the shaft 24 and the regular octagon of the opening 92 of the seal cap 90 are shifted from each other in the direction of the rotation. Therefore, the rotational positions of the respective regular octagons are aligned with each other in the retracted position or the extended position. Consequently, harness insertion work can easily be performed in the retracted position or in the extended position. In general, the harness insertion work is performed in the extended position. In such case, the rotational positions of the regular octagons are set so as to be aligned with each other in the extended position. The harness is inserted from the opening 92 of the seal cap 90 and drawn out from a lower end of the shaft 24 through the hollow 31 of the shaft 24. An entrance of the opening 92 is formed so as to have a tapered surface 92a that expands upward (FIGS. 1, 2 and 8). The tapered surface 92a functions a guide when a connector at a distal end of the harness is inserted, and consequently, facilitates the insertion of the connector. After insertion of a predetermined length of the harness, respective connectors at rear ends of the harness are connected to a terminal of the motor 76 and terminals of other electric devices mounted in the mirror rotating section 15.

Figure 4A:
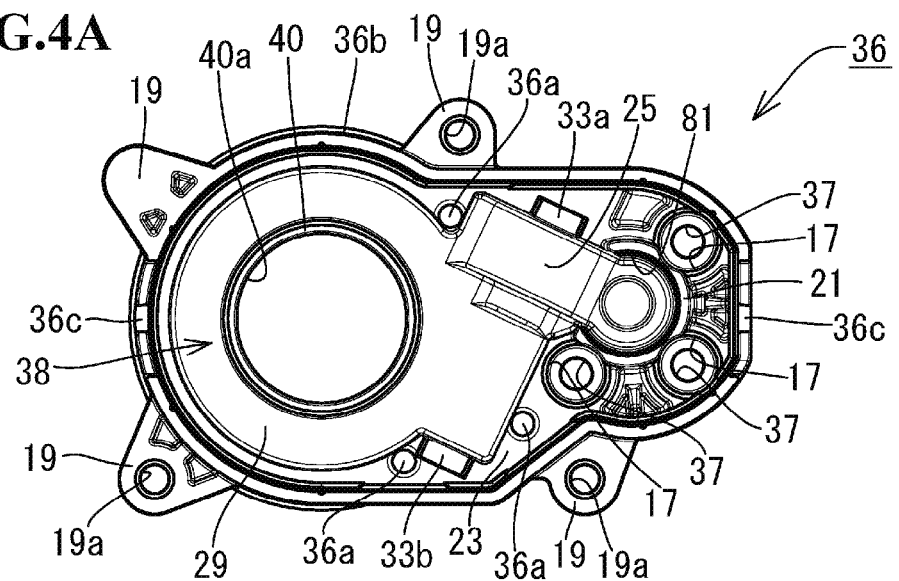
FIG. 4A is a plan view of the frame alone in the electric retracting unit in FIG. 1.
Figure 4B:
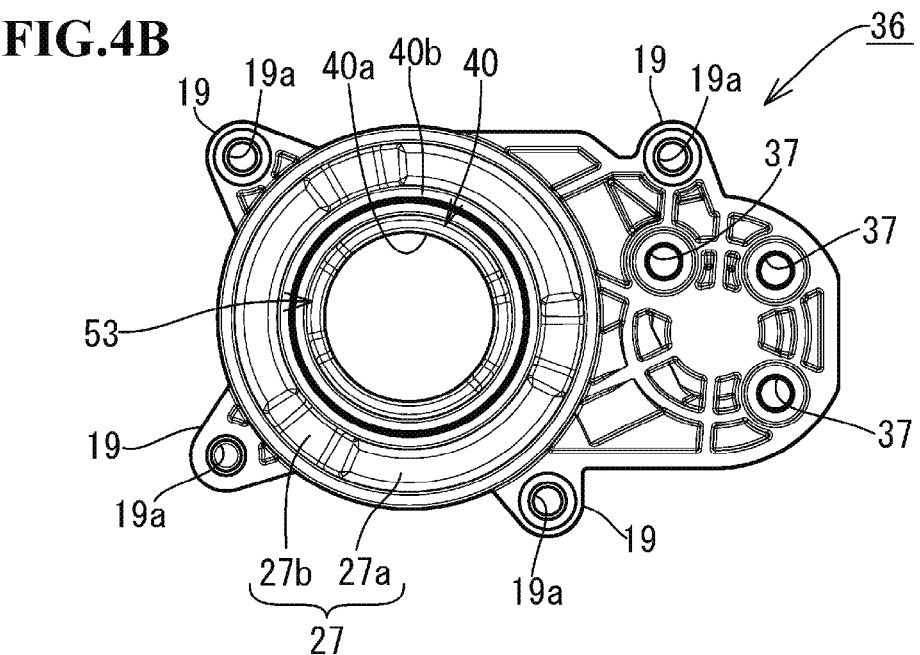
FIG. 4B is a bottom view of the frame alone.

FIGS. 4A and 4B illustrate a structure of the frame 36 alone. FIG. 4A is a plan view, and FIG. 4B is a bottom view. In FIG. 4A, in the inner space 38 on the inner side of an outer wall 36b of the frame 36, e.g., an opening 40a on the inner circumferential side of the cylinder 40, an annular flat surface 29, bearings 33a, 33b, a recess 25, a step 23, a cylinder 21, and three round recesses 17 are formed in addition to the parts described above. The shaft axle 24b is rotatably inserted into the opening 40a. The shaft outside-fitting gear 54 is rotatably mounted and supported on the flat surface 29 on the outer circumferential side of the cylinder 40. The bearings 33a, 33b support outer circumferential surfaces of opposite ends 52a, 52b of the worm 52, respectively. The recess 25 is intended to avoid the worm wheel 50. The step 23 is intended to mount and support a circumferential edge of the outer plate 68 thereon, and is formed substantially continuously on an entire circumference of the inner space 38. The cylinder 21 forms a columnar space 81 for housing the worm 80. The three screw-fastening bosses 70 in the lower surface of the outer plate 68 are inserted into the three recesses 17, respectively. Attachment bases 19 for screw-fastening the rotating part 16b (that is, the frame 36, etc.) of the electric retracting unit 16 to the visor 14 (FIG. 2) are formed so as to protrude from an outer circumferential surface of the outer wall 36b of the frame 36. A screw hole (or a screw through hole) 19a for the screw-fastening are formed in each of the attachment bases 19. Also, two claws 36c for attaching the seal cap 90 to the frame 36 via claw engagement are formed so as to protrude from the outer circumferential surface of the outer wall 36b of the frame 36. In FIG. 4B, the crest-valley repeated shape 27 (that is, valleys 27a and crests 27b) that engages with the crest-valley repeated shape 26 (that is, valleys 26a and crests 26b in FIG. 1) of the shaft base 24a is formed in a bottom surface of the frame 36. The lower end surface 40b of the cylinder 40 faces the bearing surface 30 of the shaft base 24a via the resin washer 34 (FIG. 1). The lower end surface 40b and the bearing surface 30 slide relative to each other along with rotation of the rotating part 16b. Also, the three screw through holes 37 are formed in the bottom surface of the frame 36. The three screws 82 (FIG. 1) for screw-fastening the frame 36 and the outer plate 68 to each other are inserted into the screw through holes 37.

Figure 5A:
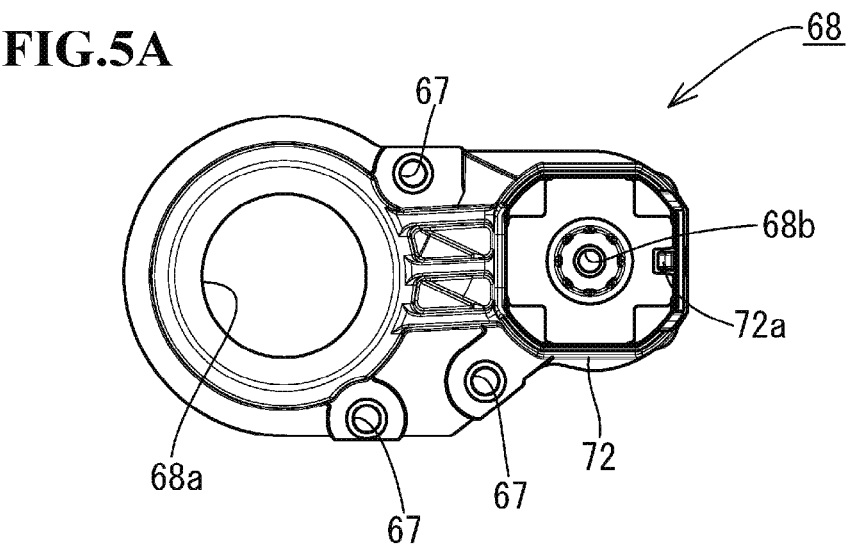
FIG. 5A is a plan view of the outer plate alone in the electric retracting unit in FIG. 1.
Figure 5B:
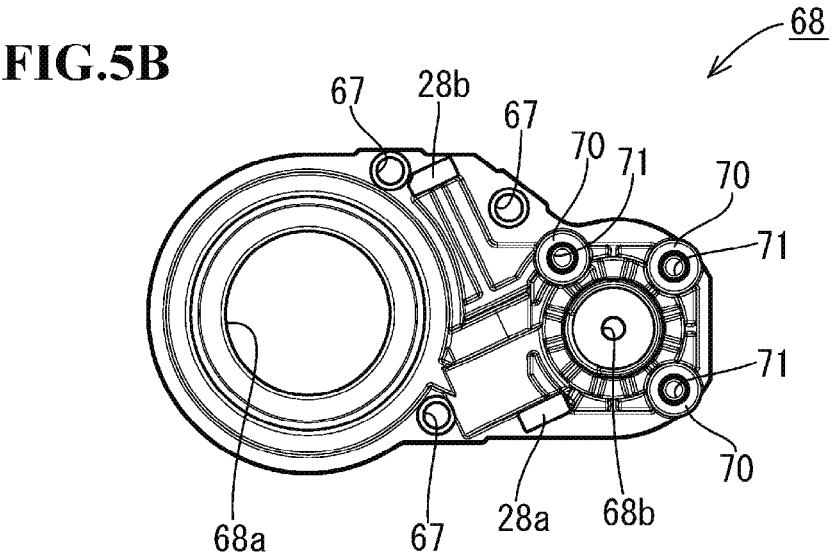
FIG. 5B is a bottomview of the outer plate alone.

FIGS. 5A and 5B illustrate a structure of the outer plate 68 alone. FIG. 5A is a plan view, and FIG. 5B is a bottom view. In the outer plate 68, an opening 68a that lets the shaft axle 24b therethrough, a hole 68b that lets the motor shaft 78 therethrough, and the three holes 67 for welding are formed so as to extend through both surfaces of the outer plate 68. In FIG. 5A, the barrel 72 that houses and holds the motor body 69 is formed in an upper surface of the outer plate 68. An engagement claw 72a that prevents the motor body 69 from coming off is formed in an inner circumferential surface of the barrel 72. In FIG. 5B, the three bosses 70 are formed in a lower surface of the outer plate 68 so as to protrude. The three bosses 70 are intended to screw-fasten the outer plate 68 and the frame 36 to each other. Also, projections 28a, 28b are formed so as to protrude at respective positions at which the projections 28a, 28b face the bearings 33a, 33b of the frame 36 in the lower surface of the outer plate 68. The projections 28a, 28b are disposed so as to face the outer circumferential surfaces of the opposite ends 52a, 52b of the worm 52, which are supported by the bearings 33a, 33b, respectively, across a small gap to restrict the worm 52 from rising from the bearings 33a, 33b.

Figure 6:
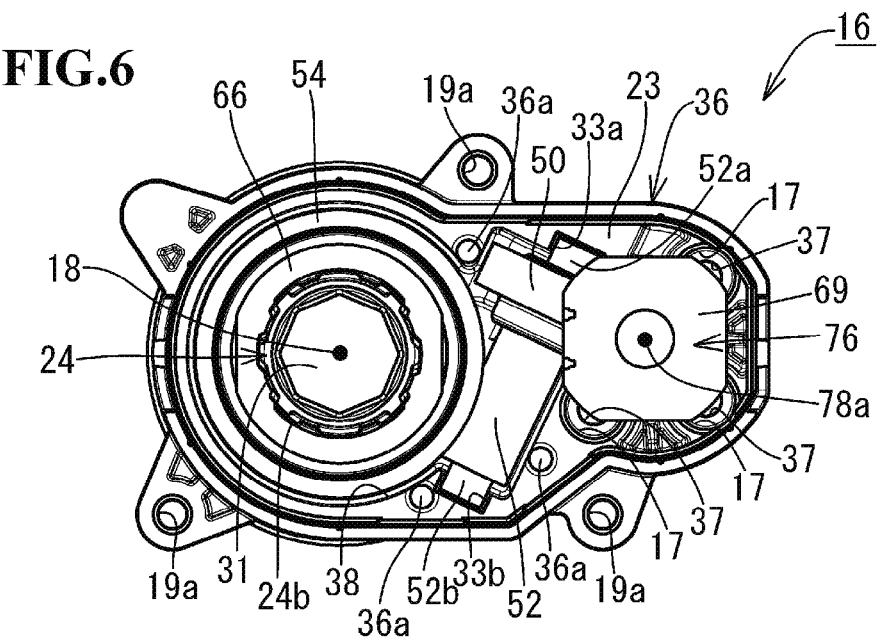
Figure 7:
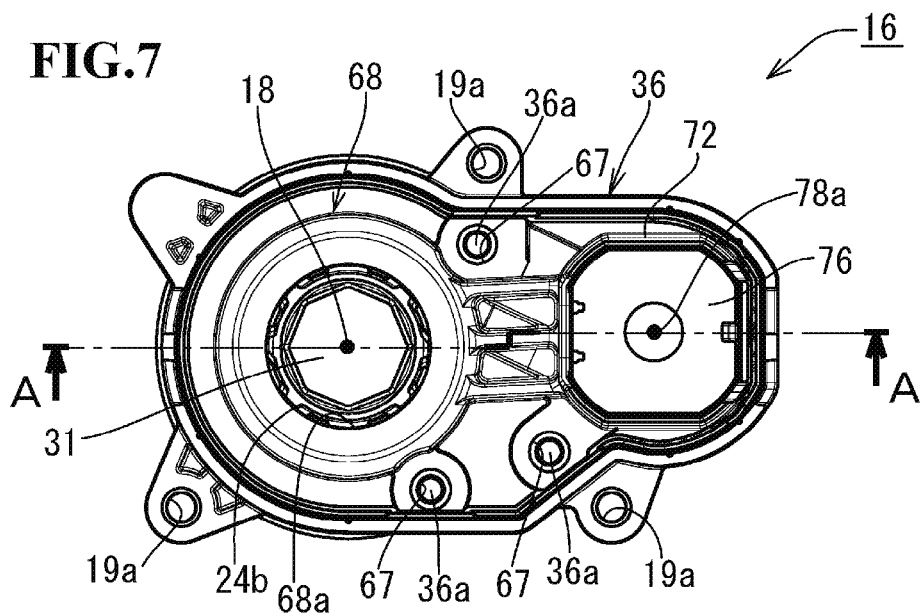
FIG. 7 is a plan view of the electric retracting unit in FIG. 1 with the seal cap removed, as viewed from above.

FIG. 6 illustrates the inside of the electric retracting unit 16 as viewed from above with the seal cap 90 and the outer plate 68 seen through. FIG. 7 illustrates the electric retracting unit 16 as viewed from above with the seal cap 90 removed. FIG. 8 illustrates a cross-section cut at the position indicated by arrows A-A in FIG. 7. However, in FIG. 8, the seal cap is illustrated. This cross-section is a cross-section cut along a plane extending through the mirror rotation axis 18 (which is the same as the axis of the shaft 24) and a motor rotation axis 78a. The mirror rotation axis 18 and the motor rotation axis 78a are parallel to each other. In FIG. 8, rotation of the motor shaft 78 is transmitted to the shaft axle 24b via the worm 80, the worm wheel 50, the worm 52, the shaft outside-fitting gear (worm wheel) 54 and the clutch plate 58. Consequently, the worm 52 rotates around an outer circumference of the shaft outside-fitting gear 54 together with the entire rotating part 16b, whereby an electric retracting/extending operation is performed.

Figure 9:
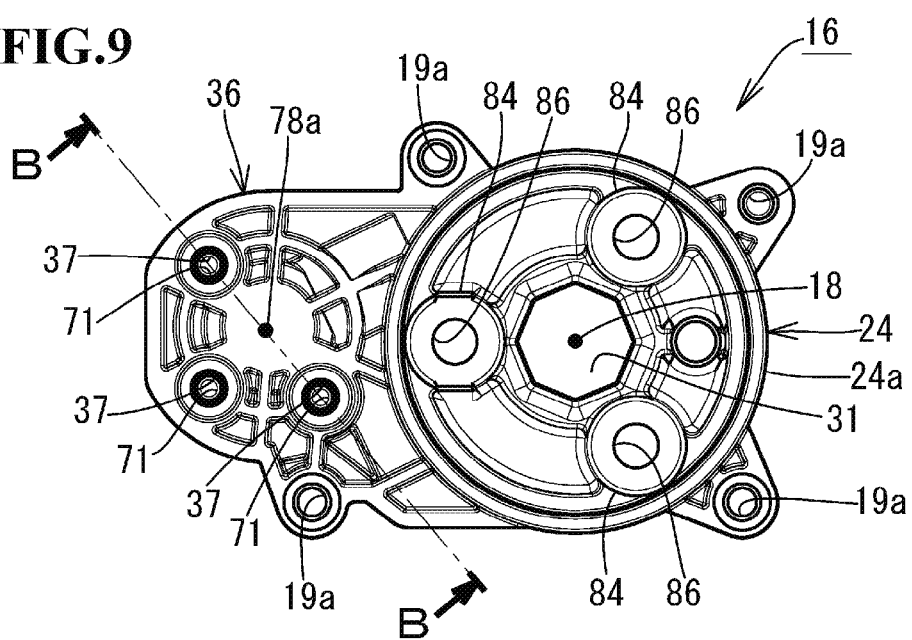
FIG. 9 is a bottom view of the electric retracting unit in FIG. 1, in which, however, screws for screw-fastening the frame and the outer plate to each other are removed.

FIG. 9 illustrates the electric retracting unit 16 as viewed from the bottom side. However, the electric retracting unit 16 is illustrated in such a manner that the screws 82 (FIG. 1) for screw-fastening the frame 36 and the outer plate 68 to each other are removed. In a bottom surface of the shaft base 24a, three bosses 84 are formed so as to protrude at positions that are circumferentially equally-spaced so as to surrounding the hollow 31.

Figure 10:
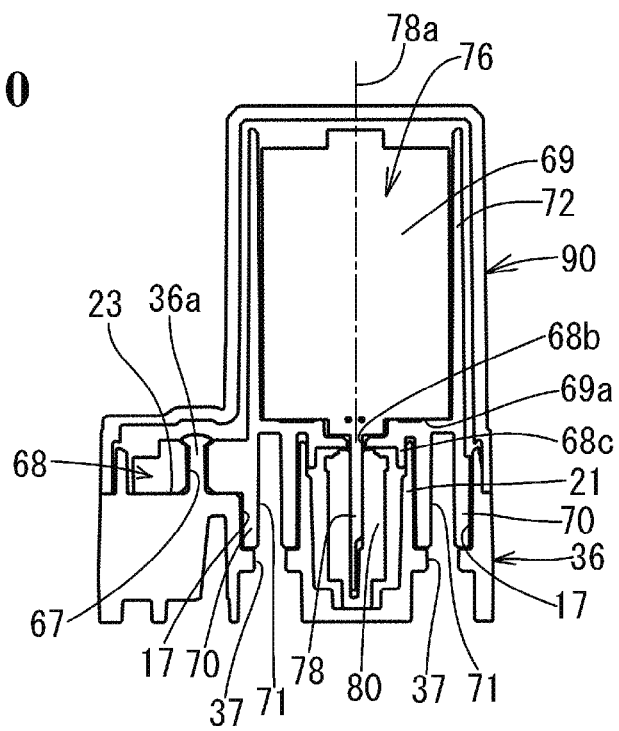
FIG. 10 is a cross-sectional view cut at the position indicated by arrows B-B in FIG. 9.

A screw hole 86 is formed in the center of each boss 84. The shaft 24 is placed upright on the mirror base 12 (FIG. 2), and the three screws 22 are screwed into the screw holes 86 in the bottom surface of the shaft base 24a from the lower side of the mirror base 12 through screw through holes of the mirror base 12, whereby the shaft 24 is fixedly provided upright on the mirror base 12. The cross-section cut at the position indicated by arrows B-B in FIG. 9 is illustrated in FIG. 10. This cross-section is a cross section cut along a plane extending through respective center axes of the two screw holes 71 located at positions that are point-symmetric to each other with respect to the motor rotation axis 78a. In the lower surface of the outer plate 68, a column 68c is formed so as to surround the hole 68b that lets the motor shaft 78 therethrough. The column 68c is fitted in the cylinder 21 that rotatably houses the worm 80 in the frame 36. Also, the three bosses 70 disposed in the lower surface of the outer plate 68 so as to surround the cylinder 21 are fitted in the respective recesses 17 of the frame 36. Consequently, the screw through holes 37 in bottom surfaces of the respective recesses 17 and the screw holes 71 at centers of the respective bosses 70 coaxially communicate with each other, respectively, and the motor shaft 78 is positioned relative to the frame 36. In this state, the three screws 82 (FIG. 1) are screwed into the respective screw holes 71 through the screw through holes 37 from the lower side of the outer plate 68. Consequently, the frame 36 and the outer plate 68 are fixed to each other. For example, as can be seen from FIG. 6, fixation places of the frame 36 and the outer plate 68 to each other via the screws 82 are disposed at positions at which at least parts of areas of the fixation places overlap the motor body 69 as viewed in a direction parallel to the axis 18 of the shaft 24. Here, "the fixation places of the frame 36 and the outer plate 68 to each other via the screws 82" are areas in which at least one of a screw through hole 37, a screw hole 71, a shank of a screw 82, a head of the screw 82, a boss 70 and a recess 17 is disposed. Also, "the positions at which at least parts of the areas of the fixation places overlap the motor body 69" are positions at which if the parts of the areas are extended in the direction parallel to the axis 18, the parts abut against the motor body 69. Therefore, in the vicinities of the fixation places, there is no need to provide areas for screw-fastening the frame 36 and the outer plate 68 to each other, the areas largely bulging from an outer circumference of the motor body 69 avoiding the motor body 69. Thus, the outer shape of the electric retracting unit 16 can be reduced to downsize the electric retracting unit 16. In particular, here, the motor rotation axis 78a is disposed in parallel to the axis 18 of the shaft 24, and the fixation places between the frame 36 and the outer plate 68 via the screws 82 are disposed at positions at which at least parts of the areas of the fixation places overlap a front end surface (end surface) 69a of the motor body 69 as viewed in the direction parallel to the axis 18 of the shaft 24. Here, "the positions at which at least parts of the areas of the fixation places overlap the front end surface 69a of the motor body 69" are positions at which if the parts are extended in the direction parallel to the axis 18, the parts orthogonally abut against the front end surface 69a of the motor body 69. Consequently, the frame 36 and the outer plate 68 can be screw-fastened to each other at positions that radially close to the motor shaft 78. As a result, positional precision of the motor shaft 78 can be enhanced, enabling reduction in noise/wear of the power transmission mechanism 20. Furthermore, two places of all the fixation places of the frame 36 and the outer plate 68 via the screws 82 are disposed at positions with the motor shaft 78 interposed therebetween. As a result, the positional precision of the motor shaft 78 can further be enhanced, enabling further reduction of noise/wear of the power transmission mechanism 20. Furthermore, the three fixation places between the frame 36 and the outer plate 68 via the screws 82 are disposed at positions at which the three parts surround the motor shaft 78. As a result, the positional precision of the motor shaft 78 can further be enhanced, enabling further reduction of noise/wear of the power transmission mechanism 20.

Figure 11:
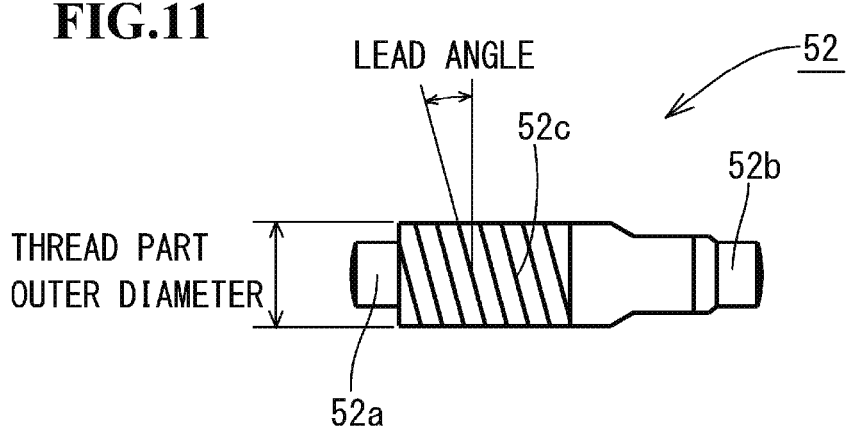
FIG. 11 is a plan view of a worm in the electric retracting unit in FIG. 1.

FIG. 11 illustrates a worm 52. A thread part 52c of the worm 52 is formed of a double-threaded worm. A lead angle of the thread part 52c is set to 8 to 15 degrees so that a self-locking effect can be obtained. An outer diameter of the thread part 52c is set to be an outer diameter that enables provision of that lead angle. In other words, the lead angle of the thread part 52c varies depending on the outer diameter of the thread part 52c: as the outer diameter is smaller, the lead angle is larger, and as the outer diameter is larger, the lead angle is smaller. The worm 52 is formed so as to have an outer diameter that is larger than that of a general single-threaded worm to be engaged with a shaft outside-fitting gear of a conventional electric retracting unit, whereby the worm 52 has a small lead angle of 8 to 15 degrees although the worm 52 is a double-threaded worm. As a result, a self-locking effect can be obtained.

Example designs of the worm 52 and the shaft outside-fitting gear 54 are indicated below.

<<Worm 52>>

Material name: SWITCH (carbon steel wire rods for cold heading and cold forging)

Processing method for thread part 52c: machining (cutting)

Outer diameter of thread part 52c: 8 mm in diameter

Lead angle of thread part 52c: 8 degrees

<<Shaft Outside-Fitting Gear 54>>

Material name: SMF (Iron-based sintered alloy)

Figure 12:
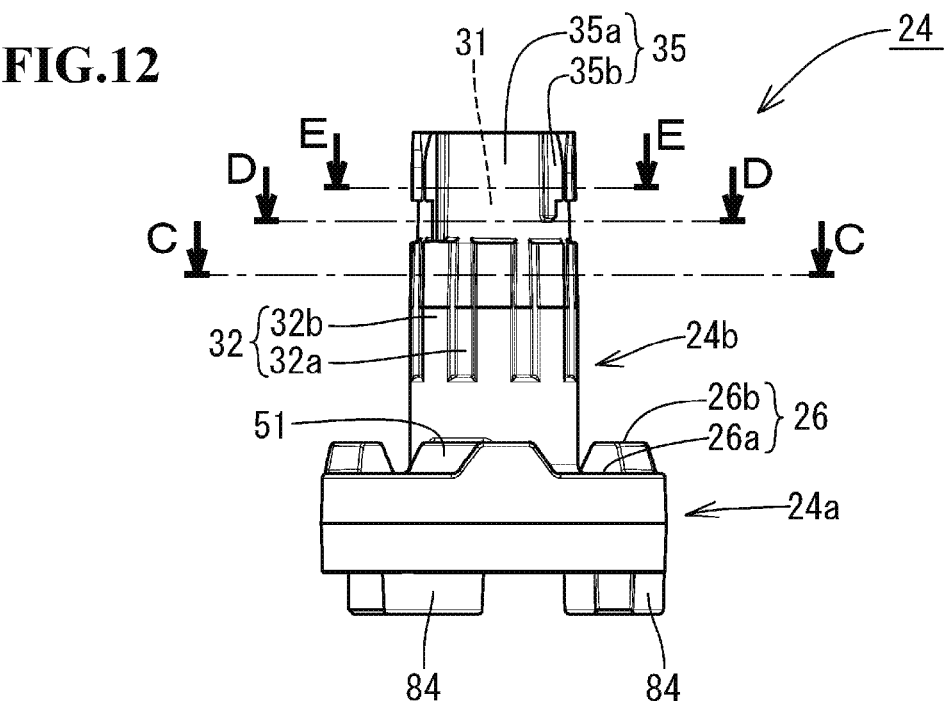
FIG. 12 is a front view of a shaft in the electric retracting unit in FIG. 1.
Figure 13A:
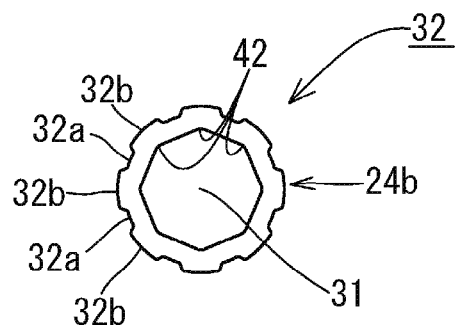
FIG. 13A is a cross-sectional view cut at the position indicated by arrows C-C in FIG. 12.
Figure 13B:
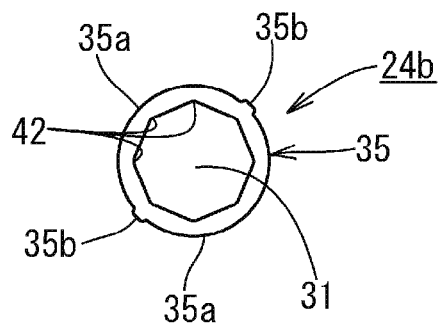
FIG. 13B is a cross-sectional view cut at the position indicated by arrows D-D in FIG. 12.
Figure 14:
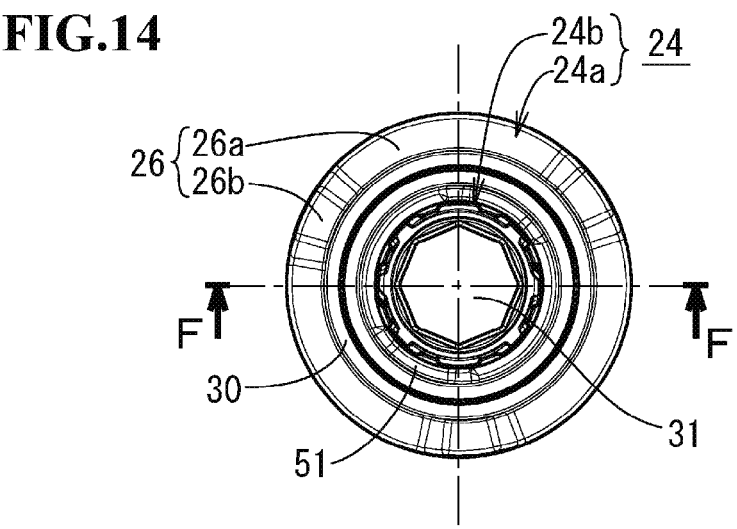
FIG. 14 is a plan view of the shaft in the electric retracting unit in FIG. 1.
Figure 15:
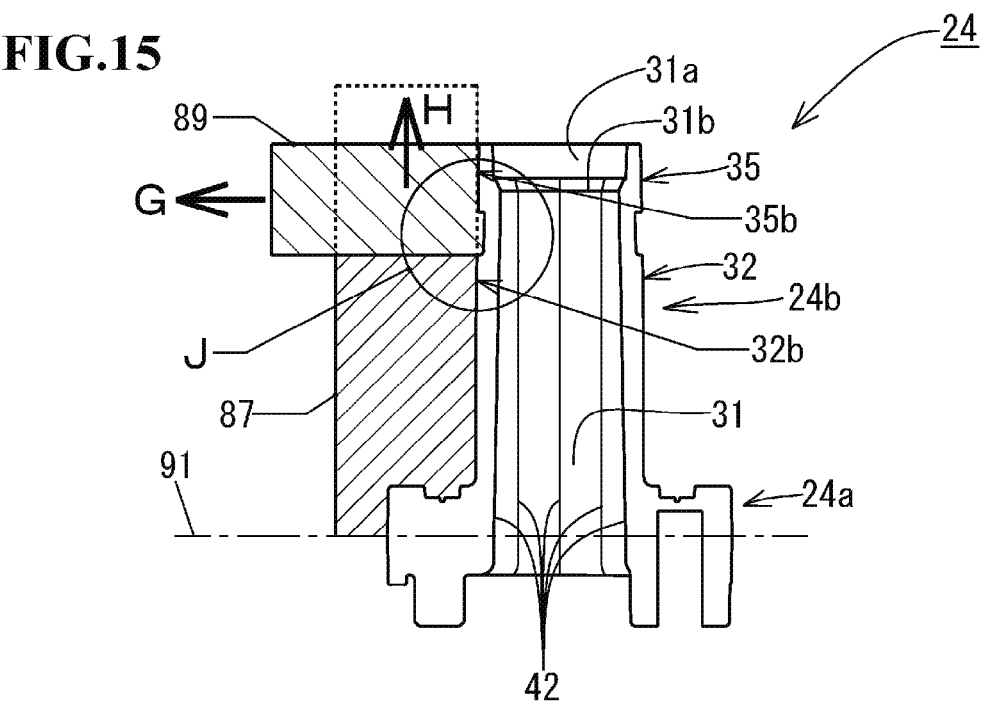
FIG. 15 is a cross-sectional view cut at the position indicated by arrows F-F in FIG. 14 and also schematically illustrates disposition of a part of a mold for casting the shaft.

A detailed structure of the shaft 24 will be described. FIG. 12 illustrates a structure of the shaft 24 as viewed from the front side. FIGS. 13A, 13B and 130 illustrate cross-sections cut at the positions indicated by arrows C-C, D-D and E-E in FIG. 12, respectively. FIG. 14 is a plan view of the structure of the shaft 24. FIG. 15 illustrates a cross-section cut at the position indicated by arrows F-F in FIG. 14. The shaft 24 has a cross-sectional shape in which an inner circumferential surface has a regular octagonal shape and an outer circumferential surface has a shape resulting from the rotation preventing projection/recess shape 32 and the plate locking projection/recess shape 35 being provided at a round surface, in the direction orthogonal to the axis thereof. If the outer circumferential surface of the shaft 24 has a round shape, the shaft 24 is thin at each of vertexes 42 of the regular octagon of the inner circumferential surface of the shaft 24. However, here, the rotation preventing projections 32b are formed at positions on the outer circumference side of the respective vertexes of the regular octagon in the outer circumferential surface of the shaft 24, the parts of the shaft 24 at the respective vertexes 42 of the regular octagon can be reinforced by an increase in thickness of the parts by the rotation preventing projections 32b. Also, if the shaft 24 is thin at each of the vertexes 42 of the regular octagon, it is difficult for melted metal to run around the thin parts during casting of the shaft 24, resulting in an increase in possibility of casting failure. However, here, the formation of the rotation preventing projection 32b at the thin parts thickens the thin parts, enabling allowing favorable running of the melted metal and a decrease in possibility of casting failure.

Figure 13C:
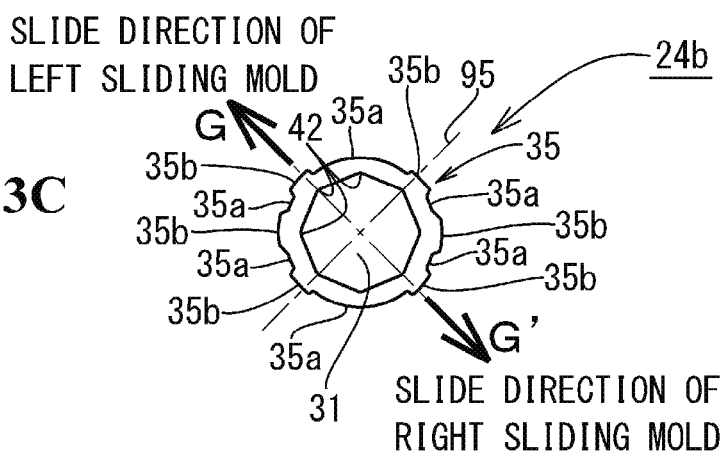
FIG. 13C is a cross-sectional view cut at the position indicated by arrows E-E in FIG. 12.
Figure 16:
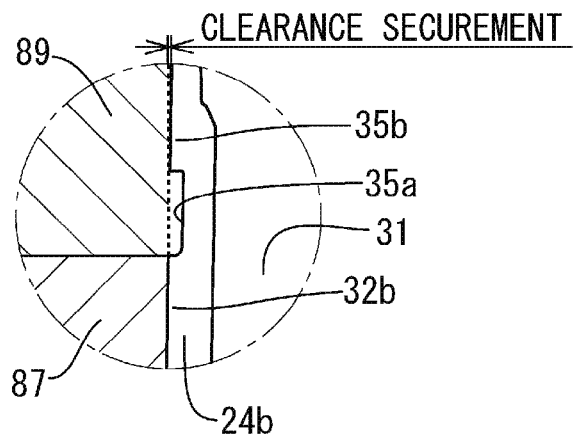
FIG. 16 is an enlarged view of part J in FIG. 15.

FIG. 15 schematically illustrates a part of an arrangement of a casting mold for casting the shaft 24. The casting mold is formed by a lower mother mold (fixed male mold) (not illustrated), an upper mother mold (movable female mold) 87, a left sliding mold 89 and a right sliding mold (not illustrated). The left sliding mold 89 and the right sliding mold slide within the upper mother mold 87. The lower mother mold and the upper mother mold 87 are vertically parted from each other at a parting line 91 (mold parting position) at an intermediate position in a thickness direction of the shaft base 24a. Therefore, the lower mother mold forms an outer shape of a lower part of the shaft base 24a which is in the lower side of the parting line 91 in the thickness direction of the shaft base 24a. The upper mother mold 87 forms an outer shape of an upper part of the shaft base 24a which is in the upper side of the parting line 91 in the thickness direction of the shaft base 24a and also forms an outer shape of the shaft axle 24b (except the plate locking projection/recess shape 35). The left sliding mold 89 and the right sliding mold form an entire circumference of the plate locking projection/recess shape 35. A parting line (mold parting position) in a horizontal direction between the left sliding mold 89 and the right sliding mold is indicated in FIG. 13C. In other words, the left sliding mold 89 and the right sliding mold are horizontally parted from each other at a parting line (mold parting position) 95 extending through center positions of plate locking projections 35b, 35b that face each other across the axis of the shaft 24. Therefore, the left sliding mold 89 and the right sliding mold form a left half and a right half of the plate locking projection/recess shape 35, respectively. The upper side and the lower side of an inner circumferential surface of the hollow 31 of the shaft 24 are formed by the upper mother mold and the lower mother mold with a constriction 31b in an upper part of the hollow 31 as a boundary. In FIGS. 13C and 15, directions in which the respective molds are removed after the molding of the shaft 24 are indicated by arrows. In other words, first, the left sliding mold 89 and the right sliding mold are slid in left/right directions G, G', respectively, as illustrated in FIG. 13C to remove the left sliding mold 89 and the right sliding mold from the shaft axle 24b. Subsequently, the upper mother mold 87 is pulled up as indicated by arrow H in FIG. 15 to remove the upper mother mold 87 from the shaft 24. A clearance is secured so as to prevent the upper mother mold 87 from interfering with (that is, being caught by) the plate locking projections 35b when the upper mother mold 87 is pulled and removed. In other words, as illustrated in FIG. 16, which is an enlarged view of part J in FIG. 15, a clearance is secured by designing the plate locking projections 35b to be slightly lower than the rotation preventing projections 32b. After the removal of the upper mother mold 87 from the shaft 24, the completed shaft 24 can be pulled up and ejected from the lower mother mold.

Figure 17:
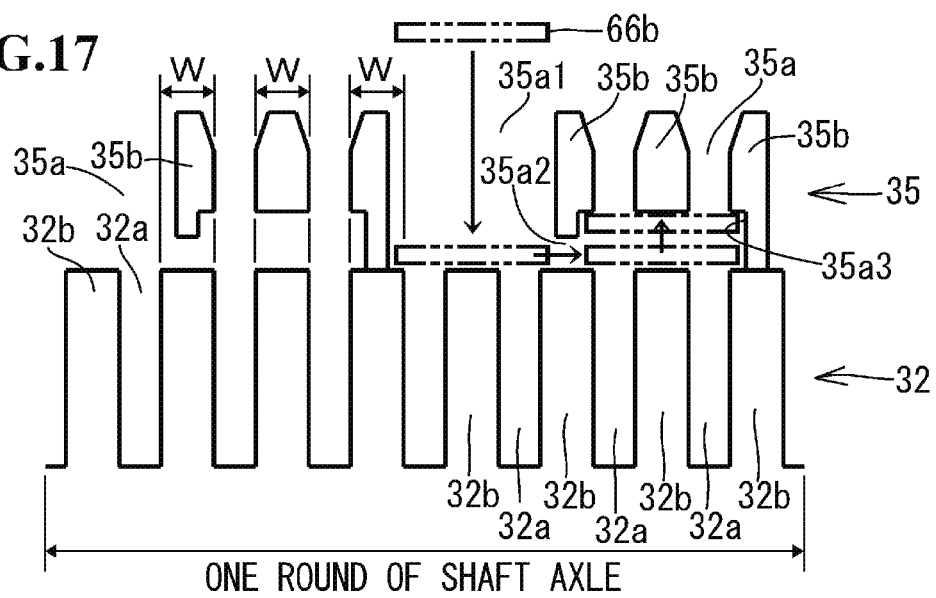
FIG. 17 is a development view of a recess/projection pattern in an outer circumferential surface of a shaft axle of a shaft in the electric retracting unit in FIG. 1, in which the recess/projection pattern corresponding to one round of the shaft axle is illustrated in a developed manner, and also illustrates a route for entry of a protrusion of a plate.
Figure 18:
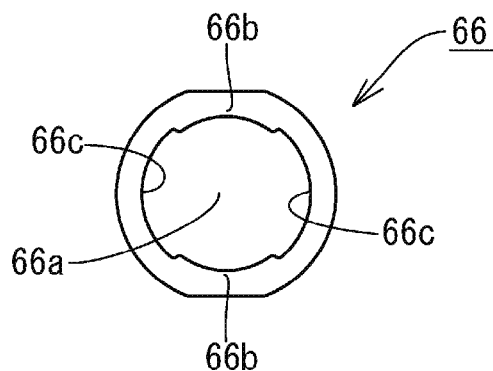
FIG. 18 is a front view of the plate in the electric retracting unit in FIG. 1.

FIG. 17 illustrates a recess/projection pattern formed in the outer circumferential surface of the shaft axle 24b, the recess/projection pattern corresponding to one round of the shaft axle 24b, in a developed manner. The rotation preventing recesses 32a and the plate locking recesses 35a are located at a same surface height position (same radial position relative to the axis 18 of the shaft 24) and form surfaces that are continuous with each other. The plate locking projections 35b are located at a surface height position that is lower than the rotation preventing projections 32b by the amount of the clearance as mentioned above. The plate 66 locked by the plate locking projection/recess shape 35 is configured as illustrated in FIG. 18. An opening 66a that allows an upper part of the shaft axle 24b (that is, a part in which the plate locking projection/recess shape 35 is formed) to be inserted thereto is formed in a surface of the plate 66. Two protrusions 66b, 66b that protrude radially inward side are formed at positions facing each other across a center position of the opening 66a. The opening 66a has a shape in which a large circle formed by large-diameter parts 66c, 66c (that is, parts excluding the projections 66b, 66b) and a small circle formed by the protrusions 66b, 66b are concentrically combined. A diameter of the opening 66a at positions of the large-diameter parts 66c, 66c is slightly larger than the diameter of the shaft axle 24b at each position at which plate locking projections 35b, 35b are arranged back to back. A diameter of the opening 66a at positions of the protrusions 66b, 66b is smaller than the diameter of the shaft axle 24b at each position at which the plate locking projections 35b, 35b are arranged back to back and is slightly larger than the diameter of the shaft axle 24b at each position at which plate locking recesses 35a, 35a are arranged back to back. Since the plate 66 is a bilaterally symmetrical shape, the plate 66 can be attached to the shaft axle 24b irrespective of the front side or the back side of the plate 66. In FIG. 17, passages for allowing the protrusions 66b, 66b of the plate 66 to pass therethrough are formed in the plate locking recesses 35a. In other words, each of the passages has an entrance path 35a1 that makes the relevant protrusion 66b move axially, a circumferential movement path 35a2 that lets the protrusion 66b move circumferentially, and a holding space 35a3 that pushes up and hold the protrusion 66b via the pressing force of the coil spring 64. The protrusions 66b, 66b of the plate 66 move in the respective passages in such a manner as indicated by arrows in FIG. 17, and finally are held in the holding spaces 35a3 via the pressing force of the coil spring 64. Consequently, the plate 66 holds the coil spring 64 through which the shaft axle 24b is inserted, in a compressed state. The coil spring 64 held in the compressed state provides a pressing force to between the clutch surfaces 56, 60 and also to between the crest-valley repeated shapes 26, 27. As illustrated in FIG. 17, each plate locking projection 35b is disposed within a width W of the corresponding rotation preventing projection 32b (that is, a width, in the direction around the axis of the shaft 24, of the corresponding rotation preventing projection 32b) on an extension of the corresponding rotation preventing projection 32b (that is, an extension in the axis direction of the shaft 24). This disposition allows the upper mother mold 87 illustrated in FIG. 15 to be removed without a part of the upper mother mold 87 (that is, a part for forming the rotation preventing recesses 32*a*) interfering with (that is, being caught by) the plate locking projections 35*b* when the upper mother mold 87 is pulled upward and removed after molding of the shaft 24. Also, this disposition allows each plate locking recess 35*a* between the respective plate locking projections 35*b*, 35*b* to function as a passage for entry of the relevant rotation preventing projection 62*b* of the clutch plate 58 when the clutch plate 58 is fitted onto the shaft axle 24*b*. Also, in a recess/projection pattern of an outer circumferential surface of a conventional shaft axle (for example, the recess/projection pattern illustrated in FIG. 4 in Japanese Utility Model Registration No. 3197994 according to the application field by the present applicant), three heights (thicknesses) (with the aforementioned amount of the clearance ignored) are set. In other words, the rotation preventing recesses 32*a* and the plate locking projections 35*b* are set so as to have heights that are substantially the same (to be exact, the plate locking projections 35*b* are slightly smaller than the rotation preventing recesses 32*a* by the amount of the clearance for removing the upper mother mold), the rotation preventing projections 32*b* are set to be higher than the rotation preventing recesses 32*a*, and the plate locking recesses 35*a* are set to be lower than the plate locking projections 35*b*. On the other hand, in the recess/projection pattern in FIG. 17, only two heights (thicknesses) (with the aforementioned amount of the clearance ignored) are set. In other words, the rotation preventing recesses 32*a* and the plate locking recesses 35*a* are set so as to have a same height, and the rotation preventing projections 32*b* and the plate locking projections 35*b* are set so as to have heights that are substantially the same. Thus, according to the recess/projection pattern in FIG. 17, the plate locking recesses 35*a* can be made thick without specifically increasing an outer diameter of the shaft axle 24*b*. Therefore, even at each of the positions at the vertexes of the octagon, the plate locking recess 35*a* can be prevented from being extremely thin.

The above-described embodiment is configured in such a manner that a shaft (rotation support section) is fixedly provided upright on a vehicle body and rotatably supports the view device rotating section in a direction around an axis of the shaft and the view device rotating section is rotated in the direction around the axis of the shaft by a motor mounted in the view device rotating section. However, a support and rotation mechanism in a view device rotating section to which this invention is applied is not limited to such configuration. For example, a shaft (rotation support section) is fixed to a lower surface of a view device rotating section so as to hang from the lower surface, an electric driving mechanism is disposed on the vehicle body side (fixed side), the shaft is rotatably connected to the electric driving mechanism so as to be rotatable in a direction around an axis of the shaft, and the view device rotating section is driven together with the shaft to rotate, by the electric driving mechanism. This invention is applicable also to the support and rotation mechanism having such configuration. Although the above embodiment has been described in terms of a case where this invention is applied to an electric retractable rear view mirror for a vehicle, this invention is not limited to this case. For example, instead of a door mirror, this invention is applicable to an electric retractable rear view camera for a vehicle, the electric retractable rear view camera being mounted in, e.g., a door of a vehicle so as to protrude from the lateral side of the vehicle or another electric retractable rear view device for a vehicle or further to an electric retractable view device for a vehicle for a purpose other than rear viewing. An electric retractable rear view camera for a vehicle can be formed as, for example, one obtained by forming the visor 14 in FIG. 2 so as to have a small size and mounting a camera in the visor 14 as a view section body instead of a mirror plate. In this case, the camera is mounted in the visor 14 in such a manner that, when the visor 14 is in an extended position, an optical axis of the camera faces the rear side of the vehicle.

What is claimed is:

1. An electric retractable view device for a vehicle, the view device comprising a view device rotating section including a view section body mounted therein, a rotation support section that supports the view device rotating section in such a manner that the view device rotating section is rotatable relative to a vehicle body in a direction around a predetermined rotation axis, and an electric driving mechanism that electrically drives the view device rotating section to rotate in the direction around the rotation axis and thereby moves the view device rotating section to either of a retracted position and an extended position, wherein the electric driving mechanism includes a motor, and a power transmission mechanism that transmits a drive force of the motor to the view device rotating section to rotate the view device rotating section in the direction around the rotation axis, the power transmission mechanism includes a double-threaded worm, and one or more motor-side worms disposed on the motor side relative to the double-threaded worm, each of the one or more motor-side worms is a single-threaded worm, and when a large external force is applied to the view device rotating section in the direction around the rotation axis in a state where driving of the motor is stopped, a combination of the double-threaded worm and the one or more motor-side worms are self-locked.

2. The electric retractable view device for a vehicle according to claim 1, wherein:

the rotation support section includes a shaft provided in a standing manner on the vehicle body side;

the view device rotating section is supported by the shaft so as to be rotatable in a direction around an axis of the shaft;

the motor is mounted in the view device rotating section; and the power transmission mechanism includes a mechanism that transmits the drive force of the motor to the shaft to rotate the view device rotating section in the direction around the axis of the shaft.

3. The electric retractable view device for a vehicle according to claim 2, wherein:

the power transmission mechanism includes a first worm wheel fitted on an outer circumference of the shaft and thereby coupled to the shaft, and a first worm that engages with the first worm wheel and thereby provides a first worm drive; and the first worm is the double-threaded worm.

4. The electric retractable view device for a vehicle according to claim 3, wherein:

the power transmission mechanism includes a second worm connected to a motor shaft of the motor, a second worm wheel that engages with the second worm and thereby provides a second worm drive, and an intermediate transmission mechanism that transmits rotation of the second worm wheel to the first worm; and the second worm is the only motor-side worm in the power transmission mechanism.

5. The electric retractable view device for a vehicle according to claim 4, wherein the intermediate transmission mechanism includes an axle of the first worm that coaxially directly connects the second worm wheel and the first worm.

6. The electric retractable view device for a vehicle according to claim 1, wherein a lead angle of the double-threaded worm is set to 8 to 15 degrees.

7. The electric retractable view device for a vehicle according to claim 2, wherein a lead angle of the double-threaded worm is set to 8 to 15 degrees.

8. The electric retractable view device for a vehicle according to claim 3, wherein a lead angle of the double-threaded worm is set to 8 to 15 degrees.

9. The electric retractable view device for a vehicle according to claim 4, wherein a lead angle of the double-threaded worm is set to 8 to 15 degrees.

10. The electric retractable view device for a vehicle according to claim 5, wherein a lead angle of the double-threaded worm is set to 8 to 15 degrees.

* * * * *